Feb. 27, 1962 C. F. CURREY 3,023,353
SILICON DIODE PROTECTIVE CIRCUIT
Filed July 10, 1959 2 Sheets-Sheet 1

WITNESSES
Edwin E. Bassler
James F. Young

INVENTOR
Charles F. Currey
BY
Paul E. Friedemann
ATTORNEY

Feb. 27, 1962     C. F. CURREY     3,023,353
SILICON DIODE PROTECTIVE CIRCUIT
Filed July 10, 1959            2 Sheets-Sheet 2

United States Patent Office 3,023,353
Patented Feb. 27, 1962

3,023,353
SILICON DIODE PROTECTIVE CIRCUIT
Charles F. Currey, Penn Hills, Pa., assignor to Canadian Westinghouse Company, Limited, Hamilton, Ontario, Canada
Filed July 10, 1959, Ser. No. 826,217
12 Claims. (Cl. 321—12)

This invention relates to rectifier protective apparatus and more particularly to protective apparatus for use with semi-conductor type power rectifiers, for example, such as silicon or germanium.

Semi-conductor power rectifier systems generally consist of or include a number of individual rectifying elements or diodes, as we shall subsequently call them, connected in series, with several of the series branches being paralleled into a section. A complete rectifier unit consists of various combinations, configurations or arrangements, of sections connected between the main A.C. supply lines and the D.C. output buses, the exact arrangement being dependent on the particular type of rectifier circuit utilized (i.e., three-phase full-wave bridge, etc.).

Individual diodes may fail if subjected to either excessive inverse voltages or excessive forward currents. If one or several diodes of a series branch fail, the chance of the others failing is increased as the inverse voltage across the other diode is increased in proportion to the number of diodes that have failed over the total number of diodes in the series branch. Failure of one series branch in a section may completely short that section, creating a dead short circuit across the remaining sections of the unit, resulting in excessive forward currents, or greatly increased inverse voltage stress on the remaining sections, causing their subsequent failure. As semi-conductor diodes are expensive, it is desirable to provide a means of protection to prevent such a "cascade" type failure of the entire rectifier unit.

An object of this invention is to provide rectifier protective apparatus that can detect and annunciate the failure of one or more diodes of a series branch and become operative to prevent the failure of the other diodes of this branch, thereby protecting the remaining diodes in the unit.

Another object of this invention is to provide rectifier protective apparatus that is a safe reliable and an economic means of protection.

Another object is to provide a circuit which will function reliably even though the A.C. supply line voltage may vary over a wide range, thus making it suitable for use on installations where it is necessary to raise or lower the D.C. voltage over a considerable range.

Another object is to provide a circuit which will function reliably and safely when applied to a high voltage rectifier system.

Another object is to provide an effective means of electrical insulation between the high voltage power circuits (A.C. supply line and D.C. output bus) and low voltage control circuits used for detection, annunciation and protection, eliminating the possibility of any electrical potential feed from the high voltage circuits to the low voltage circuits which could damage other low voltage control apparatus or endanger the lives of operating personnel.

Other objects and advantages of this invention will become more apparent from a study of the following detailed description of the invention when done with reference to the accompanying drawing, in which.

Figure 1:
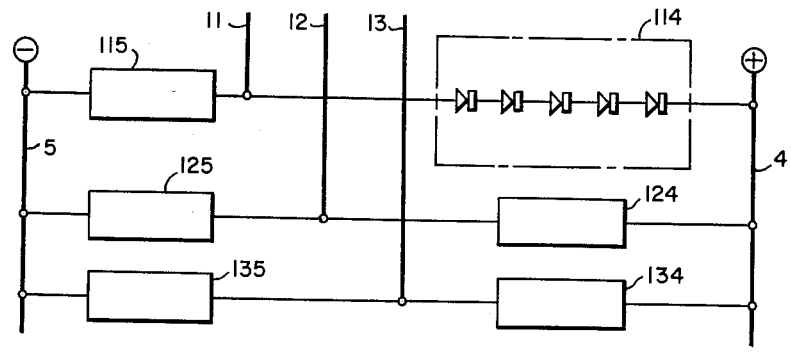
FIGURE 1 is a diagrammatic showing of a typical three-phase rectifying circuit using semiconductor rectifying elements or diodes.

The rectifier circuit shown in FIGURE 1 is energized from a three-phase alternating current source represented by the leads 11, 12 and 13. The direct current output is taken across positive bus 4 and negative bus 5. The rectifier circuit is arranged in a three-phase, full-wave bridge, with each of the six sections of the bridge including one or more branches of series connected diodes as the group of series connected silicone diodes 115, 125, 135, 114, 124 and 134. For simplicity, only one branch comprising five series connected silicon diodes is shown in FIG. 1.

Figure 2:
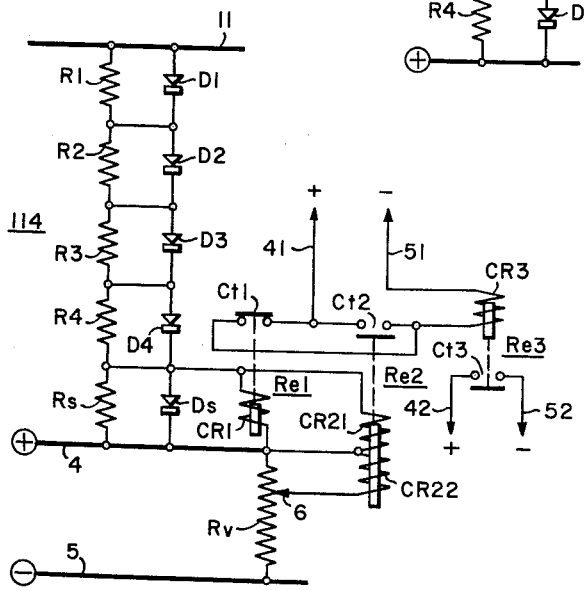
FIGURE 2 is a diagrammatic showing of an embodiment of this invention.

FIG. 2 shows in detail an embodiment of this invention for one silicon diode branch, as 114, of FIG. 1, or for a single phase system. The silicon diode series branch, including diodes D1, D2, D3, D4 and Ds, individually shunted by identical balancing resistors R1, R2, R3, R4 and Rs, respectively, is connected between alternating current line 11 and the positive direct current bus 4. Across the sensing diode Ds is placed relay coil CR1 of relay Re1 in parallel with relay coil CR21 of ratio detecting relay Re2. Relay coil CR22 of relay Re2 is connected to coil CR21 at the positive direct current bus 4 and is connected to the adjustable tap 6 on resistor Rv. Resistor Rv, having an adjustable resistance value, is connected across the direct current buses 4 and 5. The contacts Ct1, of the normally energized relay Re1, are normally open and are paralleled with contacts Ct2 of the normally non-operatively energized relay Re2, and are connected in series with relay coil CR3 of relay Re3, and are placed across the direct current buses 41 and 51. Relay Re3 is thus energized when either contacts Ct1 or Ct2 are closed. When thus energized, contacts Ct3 of relay Re3 close to active a protective circuit represented by leads 42 and 52.

The reverse impedance of individual silicon diodes varies over a large range. To obtain equal voltage across each of the diodes of a series group it is necessary to parallel each diode with a balancing resistor. These balancing resistors R1, R2, R3, R4, and Rs, as shown in FIGURE 2, must have such a resistance value to conduct a substantially higher current than the diode in its reverse direction. When a large forward current flows, the voltage drop across the diodes may be considered negligible. Under normal operating conditions, the ratio detecting relay Re2 is unenergized. The inverse voltage across the sensing diode Ds causes a magnetomotive force to be produced by relay coil CR21 in such a direction to close contacts Ct2. However, relay coil CR22 produces a magnetomotive force in the opposite direction to that of relay coil CR21. Thus by adjusting the tap 6 on resistor Rv, the magnetomotive force of relay coil CR22 can be made equal and opposite to that of relay coil CR21, and relay Re2 will remain unenergized.

The D.C. bus voltage is a nearly linear function of the voltage from the A.C. line to positive D.C. bus, and thus relay Re2 will be balanced although the A.C. line voltage (and similarly the D.C. bus voltage) varies over a substantial range.

Relay Re1 is energized by the inverse voltage across sensing diode Ds and remains open under normal operation. Contacts Ct1 are, of course, closed when relay Re1 is not energized as shown.

If one of the diodes D1, D2, D3 or D4 fails, this increases the inverse voltage across the remaining diodes by 20%. The magnetomotive force of relay coil CR21 also increases proportionally and causes a net closing force to be exerted by relay $Re2$. So contacts $Ct2$ will close and relay coil CR3 will be energized to activate the protective circuit, which removes the excessive inverse voltage from the remaining diodes to keep them from failing also. If the sensing diode $Ds$ fails while the other diodes are operative, relay coil CR1 is deenergized and contacts $Ct1$ close. Again CR3 will be energized to effect the protection of the diodes.

Figure 4:
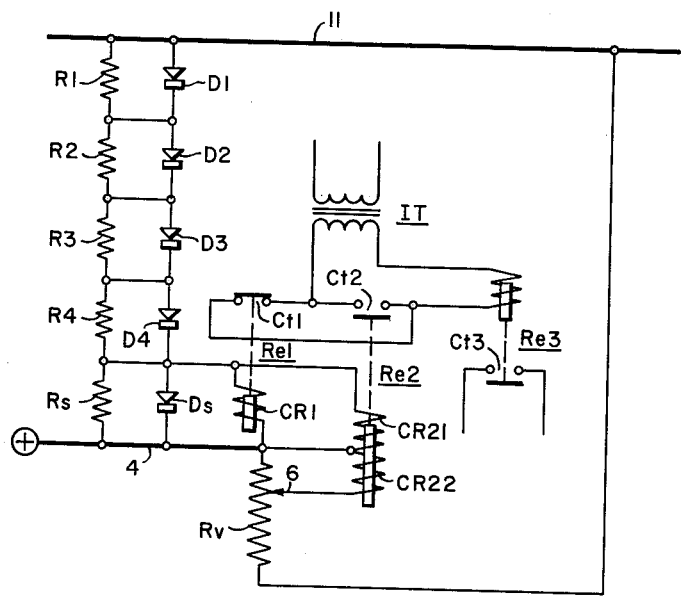
FIGURE 4 is a diagrammatic showing of another modification of this invention.

The coil of relay $Re3$ could also be arranged to obtain power through an isolating transformer IT having high voltage insulation between its primary and secondary windings. This arrangement is shown in FIG. 4. The contacts $Ct1$ and $Ct2$ of relays $Re1$ and $Re2$, respectively, would, of course, be electrically insulated from their operating coils. Also, contact $Ct3$ of relay $Re3$ would be electrically insulated from its operating coil. Thus, two sets of electrical insulation are provided in series to effectively isolate the indicating and protective control circuits from the potentially dangerous high current, high voltage power circuits consisting of the A.C. lines 11, 12 and 13, and the D.C. positive and negative buses 4 and 5.

This completes the circuit to energize relay coil CR3 which activates the protective circuit. With a suitably designed ratio sensing relay that would also be operative on the failure of the sensing diode $Ds$, relay $Re1$ could be eliminated.

Figure 5:
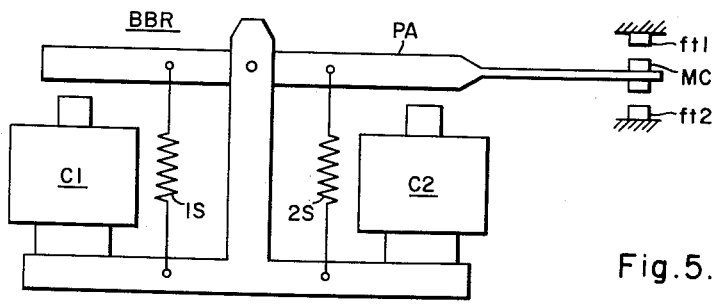
FIGURE 5 is a schematic showing of a relay that may be used as an element of this invention.

Relay $Re1$ could be eliminated by utilizing a suitable "balance beam" type relay BBR, as shown in FIG. 5, for $Re2$. This relay would have two fixed electrical contates $ft1$ and $ft2$ mounted on the relay frame, and one central moving contact MC mounted on a balanced, pivoted armature PA. Thus, an unbalance in either direction, i.e. failure of any diode in the branch, would energize the protective circuits.

In this relay shown in FIG. 5, the springs 1S and 2S balance the armature to the position shown. The coils C1 and C2 assume the functions of the coils for both the relays $Re1$ and $Re2$, and contacts MC and $ft1$ correspond to contacts $Ct1$, and contacts MC and $ft2$ correspond to contacts $Ct2$.

Figure 3:
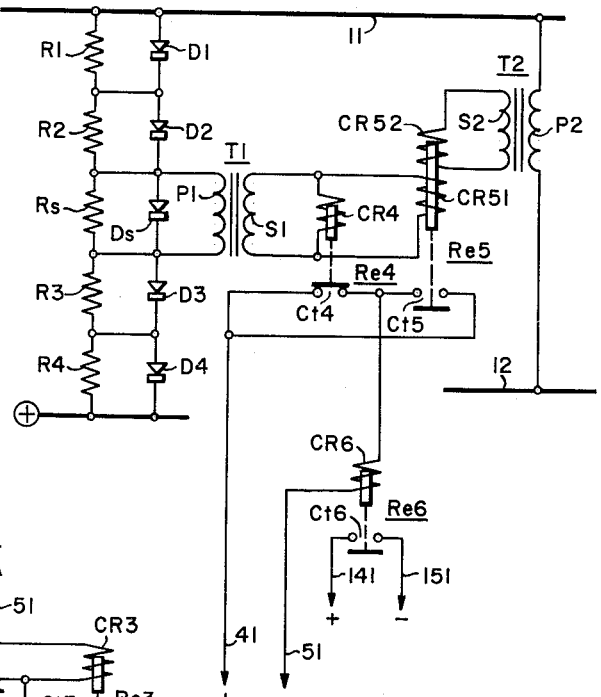
FIGURE 3 is a diagrammatic showing of a modification of this invention.

In FIG. 3 is shown a similar embodiment of this invention for one silicon diode branch of FIG. 1, or for a single phase system. The silicon diode series section, including diodes D1, D2, $Ds$, D3, and D4 individually shunted by balancing resistors R1, R2, $Rs$, R3, and R4, respectively, is connected between alternating current line 11 and positive direct current bus 4.

Across sensing diode $Ds$ is connected the primary winding P1 of transformer T1 which effectively isolates the indicating and protective control circuits from the potentially dangerous high current, high voltage power circuits.

Relay coil CR4 of relay $Re4$ in parallel with relay coil CR51 of ratio detecting relay $Re5$ is connected across the secondary winding S1 of transformer T1. Between alternating current line 11 and alternating current line 12 is placed the primary winding P2 of transformer T2. Relay coil CR52 of relay $Re5$ is connected across the secondary winding S2 of transformer T2. Contacts $Ct4$, of the normally energized relay $Re4$, are in parallel with contacts $Ct5$ of the normally non-operatively energized relay $Re5$, and are connected in series with relay coil CR6 of relay $Re6$, and placed across the direct current buses 41 and 51. Relay $Re6$ is thus energized only when either contacts $Ct4$ or contacts $Ct5$ are closed. When thus energized, relay $Re6$ closes its contacts $Ct6$ to activate a protective circuit.

Under normal operating conditions, ratio detecting relay $Re5$ is unenergized as with a suitable turns ratio for transformer T2 the opposing magnetomotive forces of relay coils CR51 and CR52 cancel each other. Relay coil CR4 is energized and contacts $Ct4$ remain open under normal operation.

If one of the diodes D1, D2, D3 or D4 fails, the inverse voltage across the remaining diodes is increased by 20%. This causes relay $Re5$ to close as a resultant closing magnetomotive force is now provided by relay coil CR51. Thus, the circuit is completed to energize relay coil CR6 and activate the protective circuit. If the sensing diode $Ds$ fails with the other diodes operative, relay coil CR4 is deenergized and contacts $Ct4$ close completing the circuit to energize relay coil CR6 and activate the protective circuit included in the circuit of conductors 141 and 151.

While but one embodiment and several modifications have been shown and described, it is apparent that the invention is not limited to the particular showing made but is susceptible of modification and change falling well within the scope of the invention.

I claim as my invention:

1. In a rectifier system comprising a plurality of rectifier units interconnected with a suitable alternating current input circuit and interconnected with a suitable output circuit receiving the rectified current from the rectifier units, said rectifier units each including a plurality of individual rectifier devices connected in series, in combination, sensing means, including ratio sensing relay means with two relay coils having a common magnetic circuit with one of said coils being connected across at least one of said rectifier devices and the other of said coils, suitable biased, connected across the direct current output circuit, said relay means operative to detect the failure of any of said rectifier devices of any of said rectifier units, protective means to remove the voltage from the rectifiers that have not failed, and means to activate said protective means.

2. In a rectifier system comprising a plurality of rectifier units interconnected with a suitable alternating current input circuit and interconnected with a suitable output circuit receiving the rectified current from the rectifier units, said rectifier units each including a plurality of individual rectifier devices connected in series, in combination, sensing means to detect the failure of any of said rectifier devices of any of said rectifier units, said sensing means including relay means connected across a first device of said rectifier devices, said relay means operative when said first device fails, ratio sensing relay means including two relay coils having a common magnetic circuit with one of said coils being connected across said first rectifier device and the other of said coils, suitably biased, connected across the direct current output, said ratio sensing relay means being operative upon the failure of any of said rectifier devices, other than said first rectifier device, to protect the rectifiers that have not failed against failure and said relay means connected across a first device of said rectifier devices operative upon failure of said first device, to protect the rectifiers that have not failed against failure.

3. In a rectifier system comprising a plurality of rectifier units interconnected with a suitable alternating current input circuit and interconnected with a suitable output circuit receiving the rectified current from the rectifier units, said rectifier units each including a plurality of individual rectifier devices connected in series, in combination, sensing means to detect the failure of any of said rectifier devices of any of said rectifier units, said sensing means, including, a first transformer with its primary winding connected across at least one of said rectifier devices, ratio sensing relay means with two relay coils having a common magnetic circuit with one of said coils being connected across the secondary winding of said first transformer, a second transformer with its primary winding connected between alternating current inputs of said rectifier system, the secondary winding of said second transformer being connected across the other coil of said ratio sensing relay means, and protective means responsive to the ratio sensing relay means for protecting the rectifiers that have not failed against failure.

4. In a rectifier system comprising a plurality of rectifier units interconnected with a suitable alternating current input circuit and interconnected with a suitable output circuit receiving the rectified current from the rectifier units, said rectifier units each including branches having a plurality of individual rectifier devices connected in series, in combination, sensng means to detect the failure of any of said rectifier devices of any of said rectifier units, said sensing means including, a first transformer with its primary winding connected across at least one of said rectifier devices, a ratio sensing relay means having two coils and having a common magnetic circuit with one of said coils being connected across the secondary winding of said first transformer, a second transformer with its primary winding connected to an alternating current input, the secondary winding of said second transformer being connected across the other coil of said ratio sensing relay means, said ratio sensing relay being operable to protect the rectifiers that have not failed.

5. In a rectifier system comprising a plurality of rectifier units interconnected with a suitable alternating current input circuit and interconnected with a suitable output circuit receiving the rectified current from the rectifier units, said rectifier units each including a plurality of individual rectifier devices connected in series, in combination, sensing means to detect the failure of any of said rectifier devices of any of said rectifier units, said sensing means including a first transformer with its primary winding connected across a first device of said rectifier devices, relay means having an actuating coil connected across the secondary winding of said first transformer, said relay means being operative when said first device fails, ratio sensing relay means having two coils and having a common magnetic circuit with one of said relay coils being connected in parallel with the actuating coil of the relay means, a second transformer, with its primary winding connected to an alternating current input, the secondary winding of said second transformer being connected across the other coil of said ratio sensing relay means, said ratio sensing relay means operative on the failure of any of said rectifier devices, other than said first device, to protect the rectifier devices that have not failed against failure and said relay means that are operative when the first device fails adapted to protect the rectifier devices that have not failed against failure.

6. In a rectifier system comprising a plurality of rectifier units interconnected with a suitable alternating current input circuit and interconnected with a suitable output circuit receiving the rectified current from the rectifier units, said rectifier units each including a plurality of individual rectifier devices connected in series, in combination, sensing means to detect the failure of any of said rectifier devices of any of said rectifier units, said sensing means including a first transformer with its primary winding connected across a first device of said rectifier devices, relay means connected across the secondary winding of said first transformer, said relay means being operative, when said first device fails, to protect the rectifier devices that have not failed, ratio sensing relay means with relay coils having a common magnetic circuit, one of said relay coils connected across said secondary winding of said first transformer, a second transformer, connected to an alternating current input, the secondary winding of said second transformer being connected across the other coil of said ratio sensing relay means, said ratio sensing relay means being operative, on the failure of any one of said rectifier devices, other than said first device, to protect the other rectifier devices.

7. In a rectifier system comprising a plurality of rectifier units interconnected with a suitable alternating current input circuit and interconnected with a suitable output circuit receiving the rectified current from the rectifier units, said rectifier units each including branches having a plurality of individual rectifier devices connected in series and a resistor connected in parallel with each rectifier device, in combination, sensing means to detect the failure of any of said rectifier devices of any of said rectifier units, said sensing means, including, a first transformer with its primary winding connected across at least one of said rectifier devices, a ratio sensing relay means having two coils and having a common magnetic circuit, one of said coils being connected across the secondary winding of said first transformer, a second transformer with its primary winding connected across a suitable voltage, the secondary winding of said second transformer being connected across the other coil of said ratio sensing relay means, said ratio sensing relay effecting the protection against failure of the rectifier devices that have not failed.

8. In a rectifier system comprising a plurality of series connected rectifier devices and a resistor connected in parallel, said rectifier units each including branches with each branch having individual series connected rectifier devices, and sensing means, including, ratio sensing relay means with two relay coils and having a common magnetic circuit, one of said coils being connected across at least one of said rectifier devices, another of said coils being connected across a direct current source, said ratio sensing relay means being operative to detect the failure of any of said rectifier devices of any of said rectifier units and to protect the rectifier devices that have not failed against failure.

9. An indicator system for a polyphase full-wave bridge rectifier system comprising a plurality of rectifier units connected in parallel in each phase, said rectifier units including branches having a plurality of individual rectifier devices connected in series, in a first phase, and sensing means including, ratio sensing relay means having a common magnetic circuit and two coils, one of said coils being connected across at least one of said rectifier devices, another of said coils being connected across a direct current source, said relay means being operative to detect the failure of any of said rectifier devices of any of said rectifier units, similar sensing means in the other phases of said polyphase system, said sensing means operative to detect the failure of any rectifier devices in any of said phase branches and to activate protective means.

10. An indicator system for a polyphase full-wave bridge rectifier system comprising a plurality of rectifier units connected in parallel in each phase leg, said rectifier units including branches having a plurality of individual rectifier devices connected in series, in a first phase, sensing means to detect the failure of any of said rectifier device in any of said rectifier units in said first phase, said sensing means including relay means connected across a first device of said rectifier devices, said relay means operative when said first device fails, ratio sensing relay means including, relay coils having a common magnetic circuit, one of said relay coils connected across said first rectifier device, another of said coils connected across a direct current supply, said ratio sensing relay means operative on the failure of any of said relay devices other than said first device, similar sensing means in the other phases of said polyphase system, said combined sensing means operative to detect the failure of any of said rectifier devices in any of said phase branches and to activate protective means.

11. An indicator system for a polyphase full-wave bridge rectifier system comprising a plurality of rectifier units connected in parallel in each phase leg, said rectifier units including branches having a plurality of individual rectifier devices connected in series, in a first phase, sensing means to detect the failure of any of said rectifier devices in any of said rectifier units in said first phase, said sensing means, including, a first transformer with its primary winding connected across certain of said rectifier devices, ratio sensing relay means with relay coils having a common magnetic circuit, one of said coils connected across the secondary winding of said first transformer, a second transformer with its primary winding connected across a voltage potential, the secondary winding of said second transformer connected across another coil of said ratio sensing relay means, similar sensing means in the other phases of said polyphase system, said combined sensing means operative to detect the failure of any of said rectifier devices in any of the phase branches and to activate protective means.

12. An indicator system for a polyphase full-wave bridge rectifier system comprising a plurality of rectifier units connected in parallel in each phase leg, said rectifier units including branches having a plurality of individual rectifier devices connected in series, in a first phase, sensing means to detect the failure of any of said rectifier devices in any of said rectifier units in said first phase, said sensing means including, a first transformer with its primary winding connected across a first device of said rectifying devices, relay means connected across the secondary winding of said first transformer, said relay means operative when said first device fails, ratio sensing relay means with relay coils having a common magnetic circuit, one of said relay coils connected across said first device, a second transformer with its primary coil connected across a voltage potential, the secondary winding of said second transformer connected across another coil of said ratio sensing relay means, said ratio sensing relay means operative to detect the failure of any of said rectifier devices other than said first device, similar sensing means in the other phase of said polyphase system, said combined sensing means operative to detect the failure of any of said rectifier devices in any of the phase branches and to activate protective means.

References Cited in the file of this patent

UNITED STATES PATENTS

| | | |
|---|---|---|
| 1,752,970 | Walty | Apr. 1, 1930 |
| 1,810,395 | Engle | June 16, 1931 |
| 1,863,162 | Keller | June 14, 1932 |
| 1,873,964 | Kern | Aug. 30, 1932 |
| 2,247,057 | Hull | June 24, 1941 |
| 2,305,380 | Edwards | Dec. 15, 1942 |
| 2,444,458 | Master | July 6, 1948 |
| 2,515,989 | Cox et al. | July 18, 1950 |
| 2,782,404 | Bergman | Feb. 19, 1957 |
| 2,813,243 | Christian et al. | Nov. 12, 1957 |